United States Patent [19]

Kobayashi

[11] Patent Number: 5,690,294
[45] Date of Patent: Nov. 25, 1997

[54] RECORDING AND/OR REPRODUCING APPARATUS HAVING A SLIDABLE CHASSIS

[75] Inventor: Junji Kobayashi, Tokyo, Japan

[73] Assignee: Canon Kabushiki Kaisha, Tokyo, Japan

[21] Appl. No.: 716,031

[22] Filed: Sep. 19, 1996

[30] Foreign Application Priority Data

Sep. 29, 1995 [JP] Japan ................... 7-253540

[51] Int. Cl.$^6$ ........................................ G11B 15/00
[52] U.S. Cl. ........................................ 242/355.1
[58] Field of Search ........................... 242/355, 355.1, 242/355.2; 360/85, 95, 96.5

[56] References Cited

U.S. PATENT DOCUMENTS

| | | | |
|---|---|---|---|
| 4,639,797 | 1/1987 | Kobayashi et al. | 360/71 |
| 4,661,864 | 4/1987 | Kuwajima | 360/85 |
| 4,789,912 | 12/1988 | Masuda et al. | 360/85 |
| 4,917,328 | 4/1990 | Kobayashi et al. | 360/96.3 |
| 4,930,028 | 5/1990 | Kunimaru et al. | 360/85 |
| 4,949,203 | 8/1990 | Kunimaru et al. | 360/85 |
| 5,153,790 | 10/1992 | Kobayashi et al. | 360/85 |

*Primary Examiner*—John P. Darling
*Attorney, Agent, or Firm*—Robin, Blecker, Daley & Driscoll

[57] ABSTRACT

A recording and/or reproducing apparatus having a rotary drum, comprises a first chassis on which the rotary drum is provided, a second chassis which is supported for sliding movement on the first chassis within a predetermined stroke, a reel mount provided on the second chassis, a brake member provided on the second chassis and capable of engaging with the reel mount, a projecting portion of the brake member projecting toward the first chassis through the second chassis, a driving member for moving the brake member by coming into abutment with the projecting portion of the brake member, and a lever turnably provided on the first chassis and having a pin at its one end, the pin being engaged with a slot, which is provided in the second chassis, so that the lever slides the second chassis, the lever being operated to overlap the projecting portion of the brake member when the second chassis projects from the first chassis.

6 Claims, 3 Drawing Sheets

RECORDING AND/OR REPRODUCING APPARATUS HAVING A SLIDABLE CHASSIS

BACKGROUND OF THE INVENTION

1. Field of the Invention

The present invention relates to a recording and/or reproducing apparatus such as a video tape recorder (VTR) and, more particularly, to a recording and/or reproducing apparatus which is arranged so that a chassis on which reel mounts are provided (a slidable chassis) projects from a chassis on which a rotary drum is provided (a main chassis), when a cassette is to be loaded or unloaded.

2. Description of the Related Art

In a conventional recording and/or reproducing apparatus, a brake driving member for driving a brake on a slidable chassis from a main-chassis side and a stopper member for fixing the brake driving member to the slidable chassis are disposed on the side of the slidable chassis which faces a main chassis. In some type of recording and/or reproducing apparatus, during loading or unloading of a cassette, when the slidable chassis projects from the main chassis (the slidable chassis moves away from a rotary drum), those members are exposed at such a position that they may be erroneously touched by a user.

In such a conventional apparatus, if the user touches such exposed members, a trouble may occur, such as an operation failure of a brake or an accidental removal of a constituent component from the apparatus. However, although it has been desired to improve the reliability of the apparatus by preventing a user from touching such constituent components during loading or unloading of a cassette, it has been practically difficult to meet such a demand.

SUMMARY OF THE INVENTION

It is, therefore, an object of the present invention to provide a recording and/or reproducing apparatus which can securely prevent accidental removal of a constituent component by means of a comparatively simple arrangement to ensure appropriate operation of the apparatus.

To achieve the above object, in accordance with one aspect of the present invention, there is provided a recording and/or reproducing apparatus having a rotary drum, which comprises a first chassis on which the rotary drum is provided, a second chassis which is supported for sliding movement on the first chassis within a predetermined stroke, a reel mount provided on the second chassis, a brake member provided on the second chassis and capable of engaging with the reel mount, a projecting portion of the brake member projecting toward the first chassis through the second chassis, a driving member for moving the brake member by coming into abutment with the projecting portion of the brake member, and a lever turnably provided on the first chassis and having a pin at its one end, the pin being engaged with a slot, which is provided in the second chassis, so that the lever slides the second chassis, the lever being operated to overlap the projecting portion of the brake member when the second chassis projects from the first chassis.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of a recording and/or reproducing apparatus according to the present invention will be described below with reference to FIGS. 1 to 4.

Figure 1:
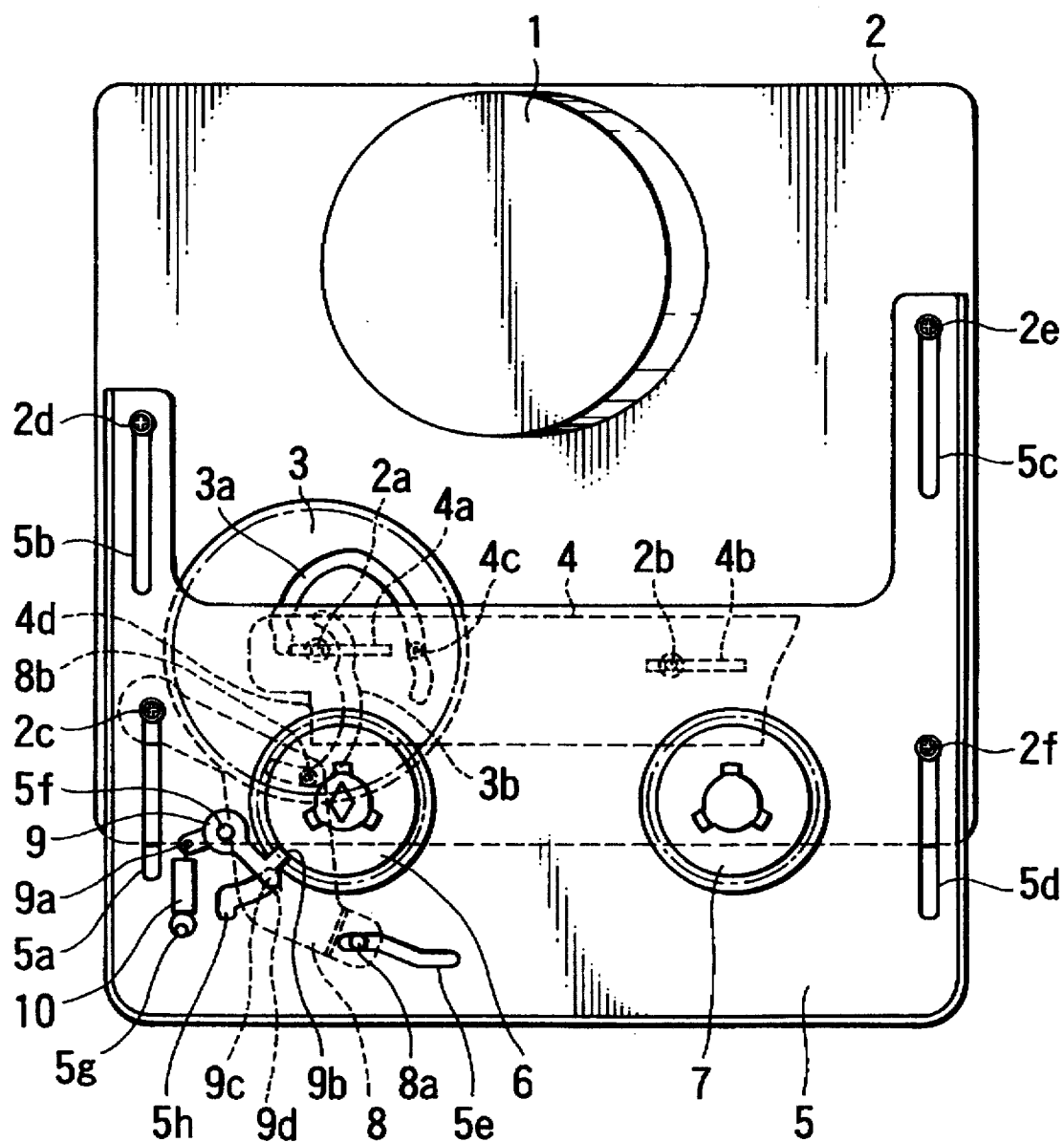
FIG. 1 is a diagrammatic plan view showing an embodiment of a recording and/or reproducing apparatus according to the present invention.
Figure 2:
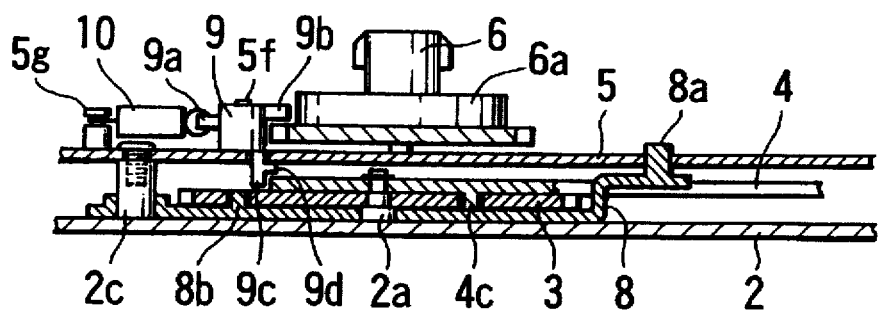
FIG. 2 is a vertical sectional view showing the essential portion of the embodiment of the recording and/or reproducing apparatus according to the present invention.
Figure 3:
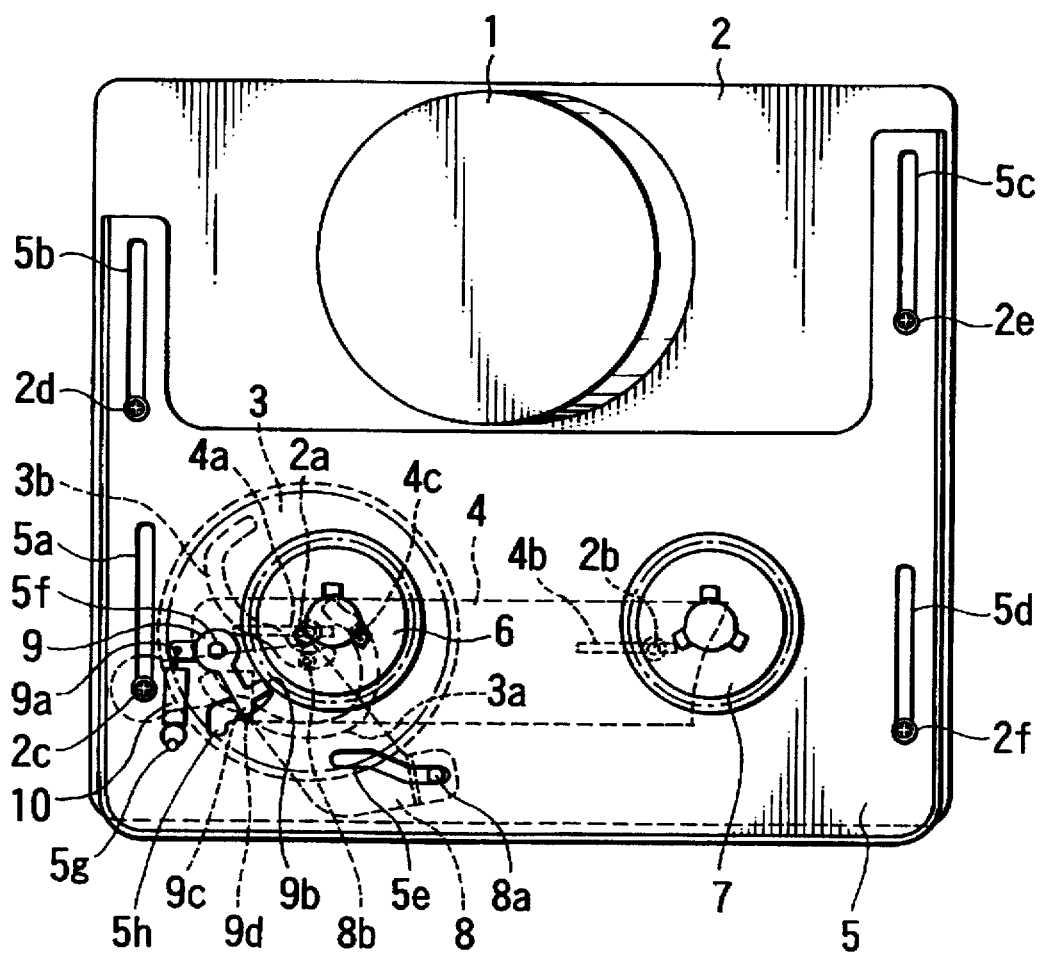
FIG. 3 is a diagrammatic plan view showing the embodiment of the recording and/or reproducing apparatus according to the present invention.
Figure 4:
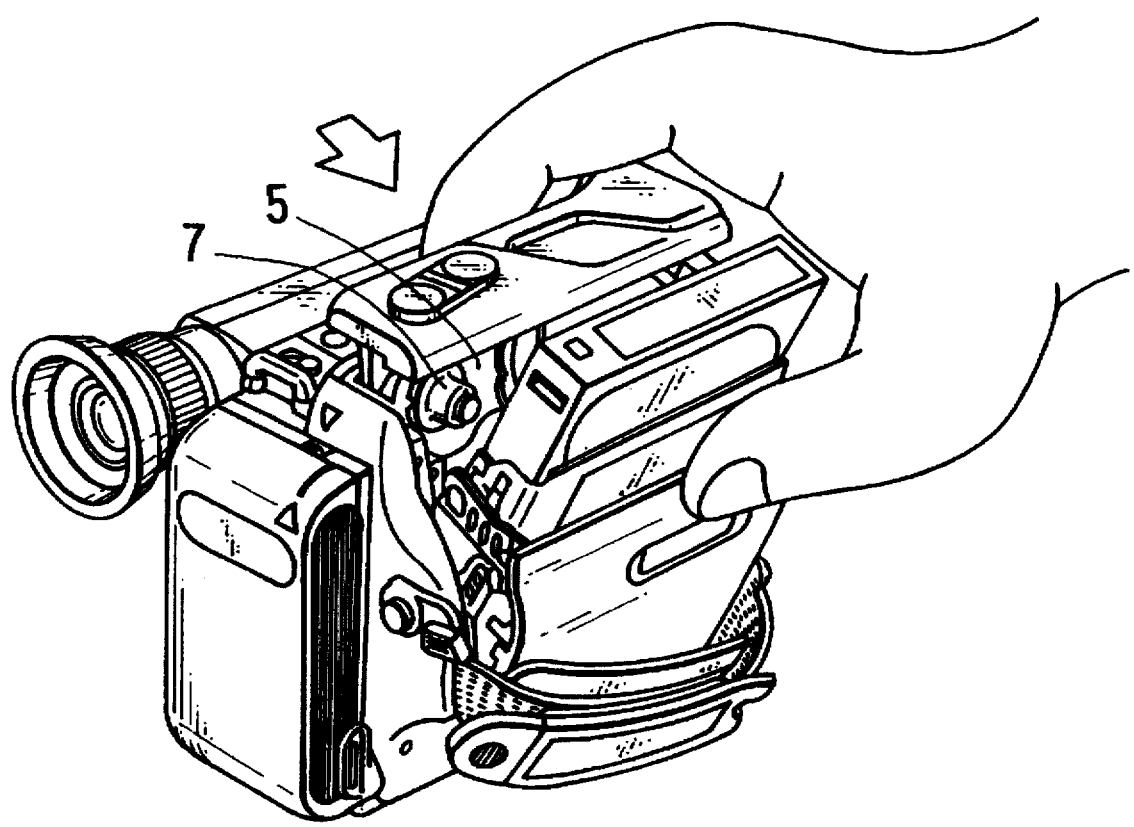
FIG. 4 is a perspective view showing a state of operation of the recording and/or reproducing apparatus according to the present invention.

FIG. 1 is a diagrammatic plan view showing the main feature of the present embodiment. The embodiment shown in FIG. 1 includes a rotary drum 1 provided with a plurality of magnetic heads (not shown), and a main chassis 2 on which the rotary drum 1 is provided. A cam gear 3 is supported for rotation about a shaft 2a which projects from the main chassis 2. A mode lever 4 has slots 4a and 4b which are respectively slidably engaged with the shaft 2a and a shaft 2b which also projects from the main chassis 2, and a shaft 4c which projects from the mode lever 4 is slidably engaged with a cam slot 3a of the cam gear 3.

The shown embodiment also includes a slidable chassis 5 on which a supply reel mount 6 and a take-up reel mount 7 are rotatably and drivably provided. When the slidable chassis 5 is located at the position shown in FIG. 1, a cassette can be loaded onto or unloaded from the slidable chassis 5. The slidable chassis 5 has slots 5a to 5d which are respectively slidably engaged with shafts 2c to 2f which project from the main chassis 2.

A slide lever 8 is supported at its one end for turning movement about the shaft 2c of the main chassis 2, and a pin 8a which projects from the slide lever 8 at its other end is slidably engaged with a slot 5e of the slidable chassis 5. A pin 8b which projects from the central portion of the slide lever 8 is slidably engaged with a cam slot 3b of the cam gear 3. A load brake 9 is supported for turning movement about a shaft 5f of the slidable chassis 5, and is urged counterclockwise, as viewed in FIG. 1, by a brake spring 10 which is tensely disposed between an engaging portion 9a of the load brake 9 and a shaft 5g of the slidable chassis 5.

A projection 9b of the load brake 9 is arranged to come into abutment with a cylindrical surface 6a of the supply reel mount 6. A lower end 9c of the load brake 9 projects toward the main chassis 2 through a slot 5h of the slidable chassis 5 (the lower end 9c is a portion of the load brake 9 formed as an extending portion; refer to FIG. 2), and is located at a height position where the lower end 9c can come into abutment with an end face 4d of the mode lever 4. A stopper portion 9d of the load brake 9 is arranged to pass through the slot 5h (a downward bent end portion of the slot 5h, as viewed in FIG. 1) when the stopper portion 9d is in a particular phase with the slot 5h. If the load brake 9 is brought in abutment with the supply reel mount 6 or the end face 4d of the mode lever 4, the stopper portion 9d overlaps the slidable chassis 5 to prevent the load brake 9 from being removed, i.e., coming off, from the slidable chassis 5.

In the operation of the recording and/or reproducing apparatus having the above-described arrangement, if a cassette is placed on and secured to the slidable chassis 5 which is projected from the main chassis 2 (the state shown in FIG. 1), the cam gear 3 is turned clockwise by means which is not shown, so that the slide lever 8 is turned counterclockwise. The slidable chassis 5 travels toward the rotary drum 1 according to the counterclockwise turn of the slide lever 8 (the state shown in FIG. 3), and the take-up reel mount 7 is fixed by means which is not shown and a tape drawn from the cassette is wrapped around the rotary drum 1.

Since the cam gear 3 continues to rotate even after the slidable chassis 5 has travelled toward the rotary drum 1, the mode lever 4 travels toward the left (as viewed in FIG. 3), So that the lower end 9c of the load brake 9 comes into abutment with the end face 4d, and the projection 9b and the cylindrical surface 6a of the supply reel mount 6 are moved away from each other, i.e., the braking of the supply reel mount 6 is released. After that, the cam gear 3 rotates further and the mode lever 4 travels further toward the left, so that a pinch roller and other associated elements (none of which are shown) are driven to enable recording or reproduction. When the cam gear 3 is reversed, the above-described operation is performed in the reverse order.

When the slidable chassis 5 is projected (refer to FIG. 4), the lower end 9c and the stopper portion 9d of the load brake 9 are exposed from the main chassis 2, but are covered by the slide lever 8 which is highly rigid and firmly secured and supported. Accordingly, a user can be prevented from touching constituent elements such as the lower end 9c and the stopper portion 9d of the load brake 9. Since an appropriate braking force is applied to the supply reel mount 6 by the brake spring 10, an appropriate tension acts on the tape so that occurrence of problems, such as slack and excessive tension, is prevented.

In addition, the user can be completely prevented from erroneously touching the lower end 9c and the stopper portion 9d of the load brake 9 and turning them to a phase position at which the stopper portion 9d can pass through the slot 5h. Accordingly, the load brake 9 is prevented from coming off from the slidable chassis 5.

As is apparent from the foregoing description, according to the present embodiment, it is possible to prevent accidental removal of a stopping/fixing component from being caused when a user erroneously touches the surface of a slidable chassis which faces the main chassis, during loading or unloading of a cassette, and it is also possible to prevent troubles due to slack or excessive tension which occurs in tape when a user presses a brake driving part during loading. Accordingly, it is possible to ensure the appropriate operation of the apparatus and improve the reliability thereof without increasing the number of constituent components. In addition, the apparatus can be made comparatively simple in construction itself and can be manufactured at a low cost.

What is claimed is:

1. A recording and/or reproducing apparatus having a rotary drum, comprising:

(a) a first chassis on which said rotary drum is provided;

(b) a second chassis which is supported for sliding movement on said first chassis within a predetermined stroke;

(c) a reel mount provided on said second chassis;

(d) a brake member provided on said second chassis and capable of engaging with said reel mount, a projecting portion of said brake member projecting toward said first chassis through said second chassis;

(e) a driving member for moving said brake member by coming into abutment with said projecting portion of said brake member; and (f) a lever turnably provided on said first chassis and having a pin at its one end, said pin being engaged with a slot, which is provided in said second chassis, so that said lever slides said second chassis, said lever being operated to overlap said projecting portion of said brake member when said second chassis projects from said first chassis.

2. A recording and/or reproducing apparatus according to claim 1, wherein said second chassis has an opening in which said projecting portion of said brake member moves.

3. A recording and/or reproducing apparatus according to claim 2, wherein said projecting portion of said brake member is provided with a stopper portion for preventing said brake member from coming off from said second chassis.

4. A recording and/or reproducing apparatus according to claim 3, wherein said opening has a portion for allowing said stopper portion to pass through said second chassis.

5. A recording and/or reproducing apparatus according to claim 1, further comprising a cam member for driving said lever.

6. A recording and/or reproducing apparatus according to claim 1, wherein a shaft for turnably supporting said lever serves as a shaft for guiding said second chassis.

* * * * *